United States Patent [19]
George

[11] Patent Number: 5,500,638
[45] Date of Patent: Mar. 19, 1996

[54] VEHICULAR GOODWILL MESSAGE SYSTEM

[76] Inventor: Ikoma A. V. George, P.O. Box 8825, 547 N. Oliver #208, Wichita, Kans. 67208

[21] Appl. No.: 186,433

[22] Filed: Jan. 26, 1994

[51] Int. Cl.⁶ ..................................................... B60Q 1/26
[52] U.S. Cl. ........................ 340/468; 340/471; 340/472; 40/591; 362/61
[58] Field of Search ..................................... 340/468, 471, 340/472, 479; 40/591; 362/61, 80.1

[56] References Cited

U.S. PATENT DOCUMENTS

4,928,084  5/1990  Reiser ..................................... 340/479
5,257,020  10/1993  Morse ................................. 340/471 X

*Primary Examiner*—John K. Peng
*Assistant Examiner*—Edward Lefkowitz

[57] ABSTRACT

A method of communication between vehicle operators. The invention employs common display LEDs, the segments of which when appropriately turned on issue desired messages on the reader board for the operators of other vehicles. To issue a message the operator of a vehicle simply depresses a button on the control box, the operator of a vehicle behind sees the message for a length of time set by a monostable timmer.

9 Claims, 7 Drawing Sheets

VEHICULAR GOODWILL MESSAGE SYSTEM

FIELD OF INVENTION

This invention in electronics is aimed at improving communication between operators of vehicles in a cordial manner.

BACKGROUND OF THE INVENTION

This invention relates to communication between vehicle operators, especially communication of goodwill messages and a plea to call for help or for emergency assistance.

Illuminated signs, which are mostly structural, have been used to provide information, decoration and sometimes advertisement. Typically such signs, known in the prior art, have a light source which illuminates structural components to display information for viewing. Electroluminescent lamps, which when excited by an alternating current of a certain voltage radiates illumination, are in use.

Prior U.S. patents have been granted to Kinstler Pat. No. 5,005,306 for an electroluminescent display or sign to be attached to the sides of a vehicle for displaying an advertising material at night, or during low light periods, for enhanced visibility. The Barlow U. S. Pat. No. 4,637,148 for an electroluminescent light which evenly illuminates the artwork in a badge worn by people. It is battery operatable, with a DC to AC converter and a flashing circuit. The Kanamori U.S. Pat. No. 4,494,326 provides an electroluminescent display in a vehicle window for illuminating a vehilce manufacturer's emblem or vehicle model. The Munoz U.S. Pat. No. 4,475,298 has an illuminated display plate which may be attached to the front of a vehicle. It has an illumination source with an opaque shield forming an indicia. The Phillips, Jr. U.S. Pat. No. 4,457,089 is a decorative automobile reflector. The Flannery U.S. Pat. No. 3,921,324 is an illuminated license plate for vehicles. It uses light tubes for lighting the license plate to define the indicia. Finally, the Gordon U. S. Pat. No. 3,614,773 is an indicator glow tube. It is characterized by a dielectric body formed with a plurality of cutouts that are configured to correspond to different intelligence symbols. All the cutouts communicate with one another through ports, by means of gases at an identical pressure.

In the past, magnetic signs for attachment to the sides of vehicles have been known.

The present, unprecedented, invention relates to an electroluminescent display for placement in a vehicle, preferably on the back dash, with the lighted display facing outward from the back of the vehicle. This positioning will allow for maximum visibility of the display by a vehicle operator behind. An accompanying control box with push buttons situates in the vicinity of the vehicle operator. At the depression of a button on the control box a message is communicated to the operator of another vehicle. This invention is less cumbersome, very inexpensive, and promises to be very useful to vehicle operators.

Other objects, features, and advantages of the present invention will become apparent from the detailed description and the accompanying drawings.

DESCRIPTION OF THE PREFERRED EMBODIMENT

Figure 1:
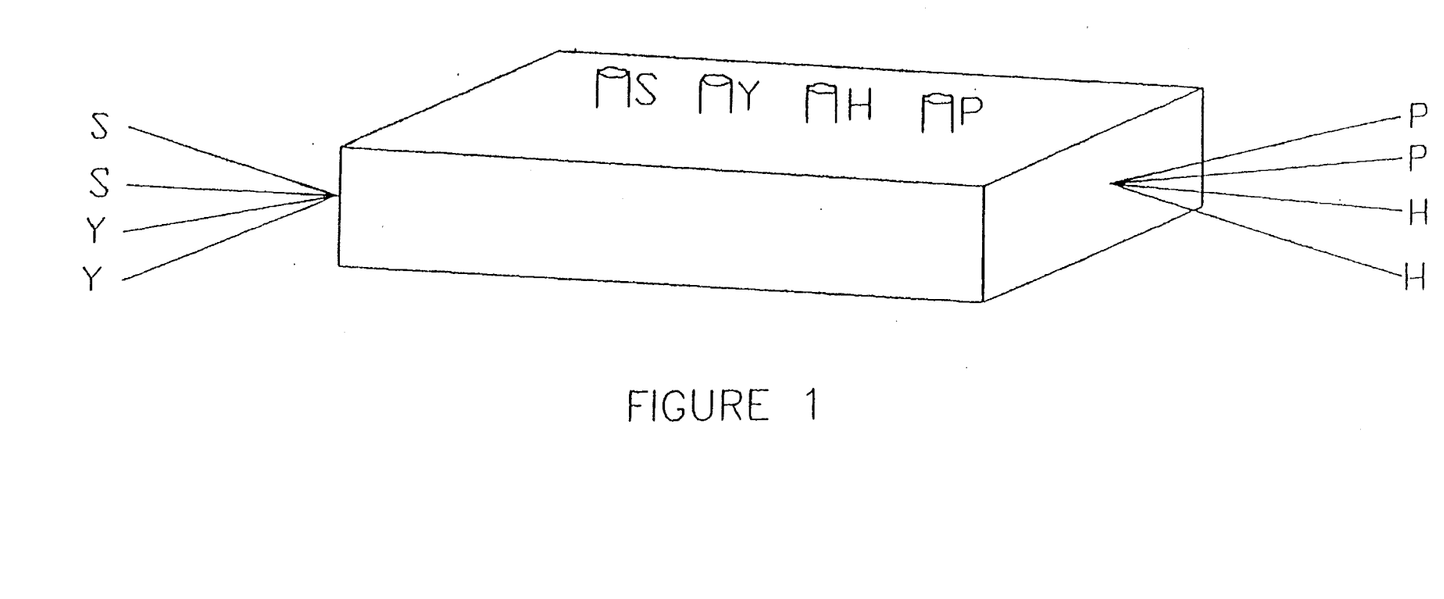
FIG. 1 is a front perspective view of the control box.
Figure 2:
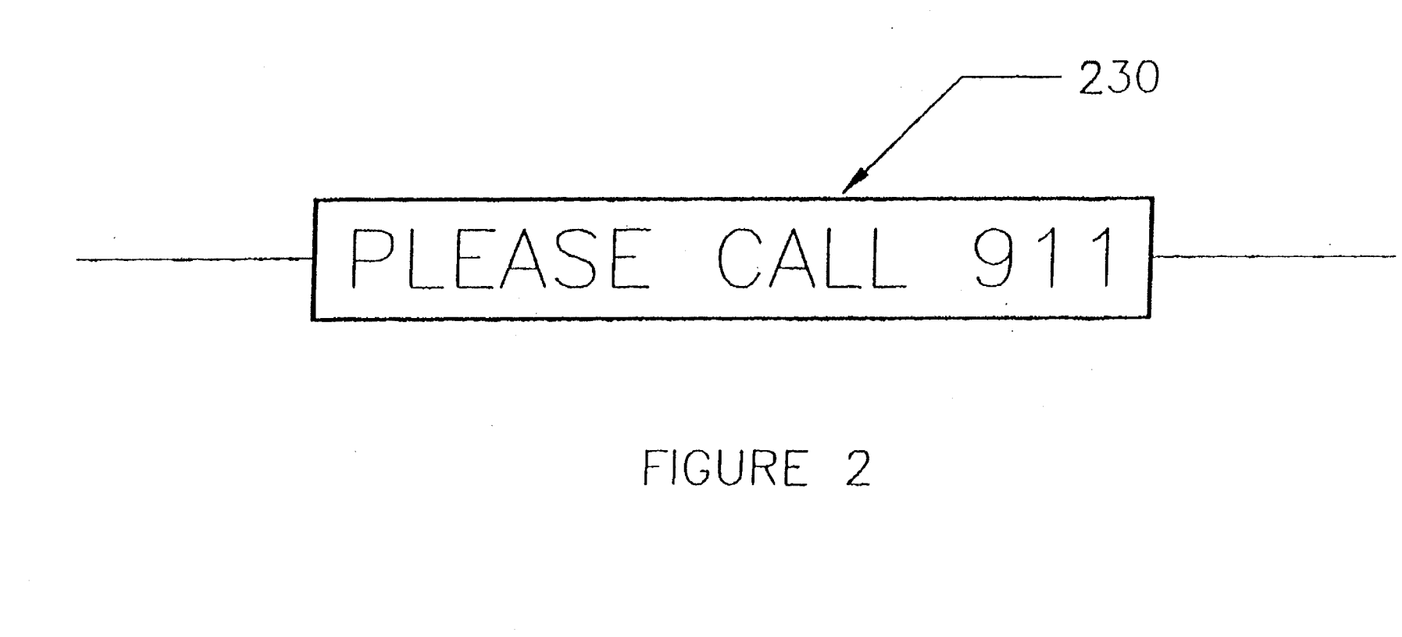
FIG. 2 is a front view of the reader board displaying "PLEASE CALL 911".
Figure 6:
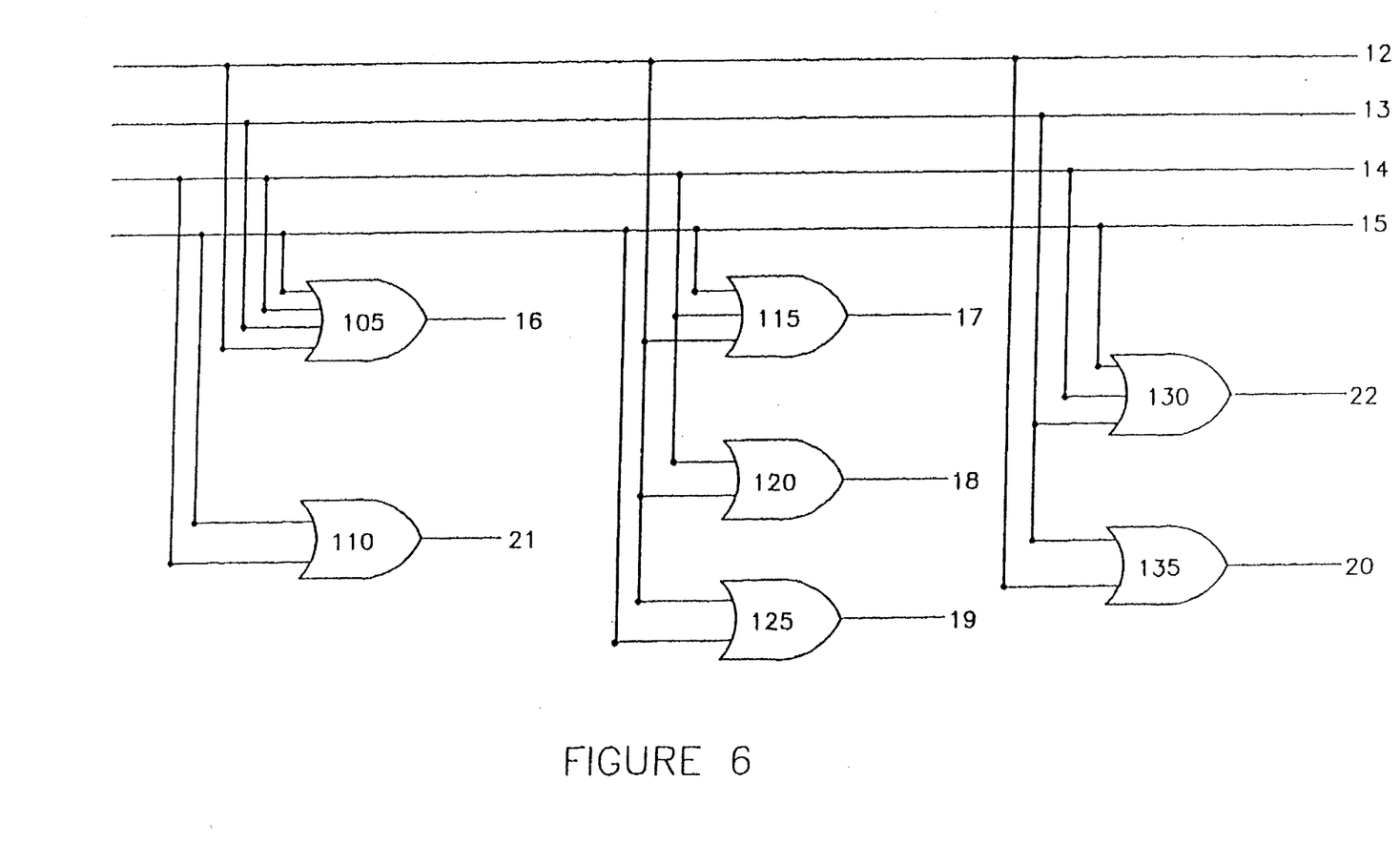
FIG. 6 shows the display LEDs control signals generator.
Figure 7:
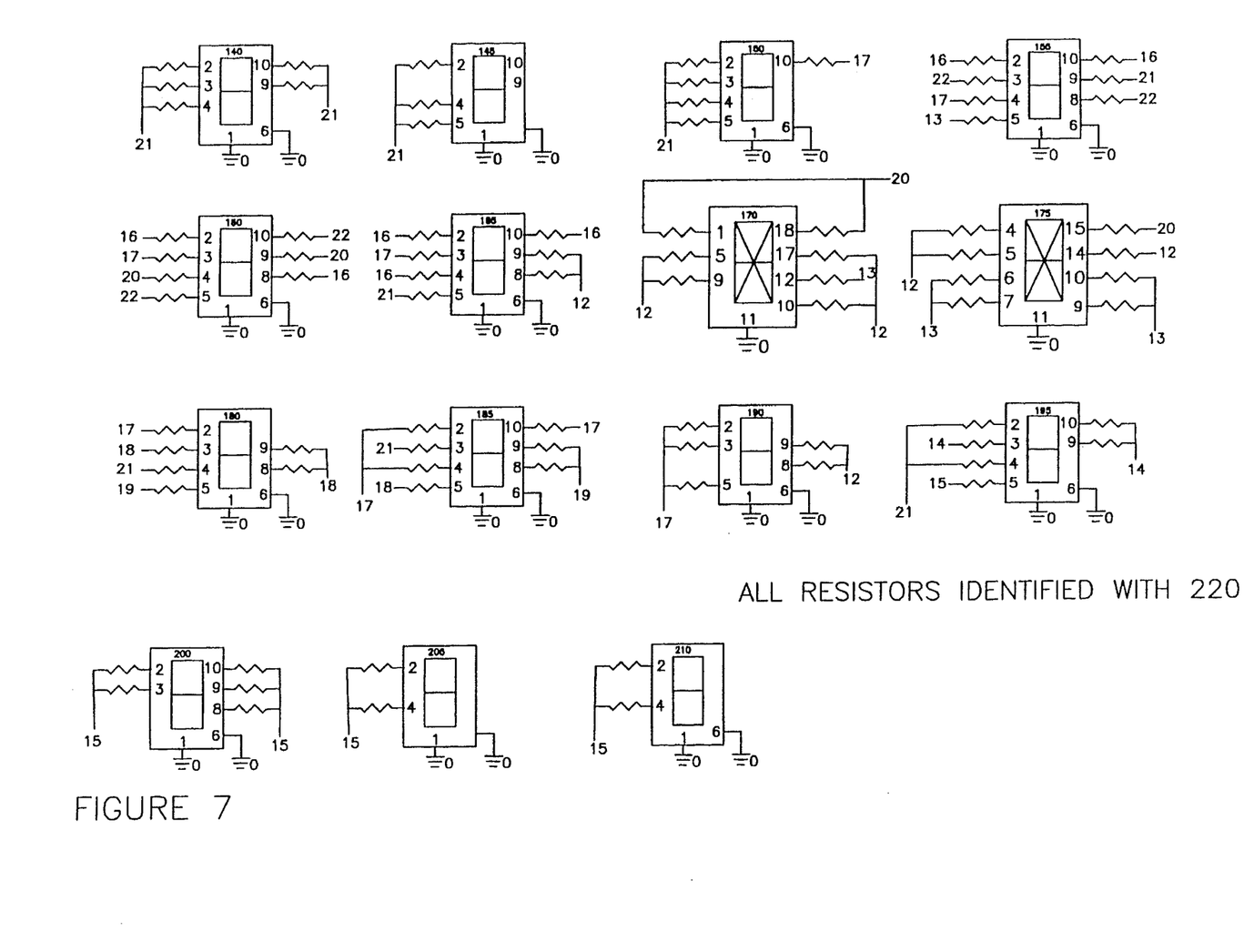
FIG. 7 shows the display LEDs and their connections.

FIG. 1 of the drawings generally designate the control box 30. 30 is comprised of four push buttons, could be more or less, identified with the letters S for "SORRY", Y for "THANK YOU", H for "PLEASE HELP" and P for "PLEASE CALL 911". Other letters or symbols could be used for any desired message. Coming out of 30 are eight leads, two connected to each button, also lettered S,Y,H,P. One lead from each button is connected to the power source, an automobile battery 35 in FIG. 4. The other lead from each button connects to R1 40. 40 connects to R2 45. The other end of 45 is connected to ground 0 to complete the control signals circuit of FIG. 4. The control signals taken out at the points numbered 2,3,4 and 5 are connected to the inverter 50. The inverted signals from 50 numbered 6,7,8 and 9 are used to trigger the timers 55 and 60 in FIG. 5, yet to be described. R3 70 and R4 75 in FIG. 4 form a voltage divider, its output at 1 is used to bias the inverters 50 in FIG. 4 and the timers 55, 60 and 65 in FIG. 5. 55 and 60 operate in a monostable mode with 95 and 100 chosen to set the length of time any message should be displayed, 10 seconds in this invention. If triggered by 6 or 7, the output 10 or 11 of 60 will be taken to drive 65 through 10 or 11 on $R_A$ 80. 65 is in the astable mode with 80, 85 and 90 selected for any desired frequency and duty cycle, for this invention the frequency is 0.5 Hz and the duty cycle is 75%. The outputs of the timers taken at points 12, 13, 14 and 15 are used to drive the logic gates 105, 110, 115, 120, 125, 130 and 135 in FIG. 6. It will be appreciated that other types of logic gates or combinations of them could be used. The outputs of 105, 110, 115, 120,125, 130 and 135 respectively numbered 16, 21, 17, 18, 19, 22, 20 and the outputs 12, 13, 14 and 15 will now be used to drive the display LEDs 140, 145, 150, 155, 160, 165, 170, 175, 180, 185, 190, 195, 200, 205 and 210 in FIG. 7 through the resistor 220. The value of 220 is such as to achieve a desired brightness for daytime and night-time visibility. Both seven segment 140, 145, 150, 155, 160, 165, 180, 185, 190,195, 200, 205, 210 and fourteen segment 170, 175 have been used in this invention, showing that either or both types could be used. The display segments of FIG. 7 are held in place by a rectangular box 250 in FIG. 3. 250 houses a circuit board which contains circuits of the invention. 250 is made of such plastic material as to be able to withstand winter and summer temperatures, as well as heat from the defroster. The front of 250, the reader board, shown displaying "PLEASE HELP" in FIG. 3 and "PLEASE CALL 911" in FIG. 2 is covered with a translucent material 230.

OPERATION

Figure 4:
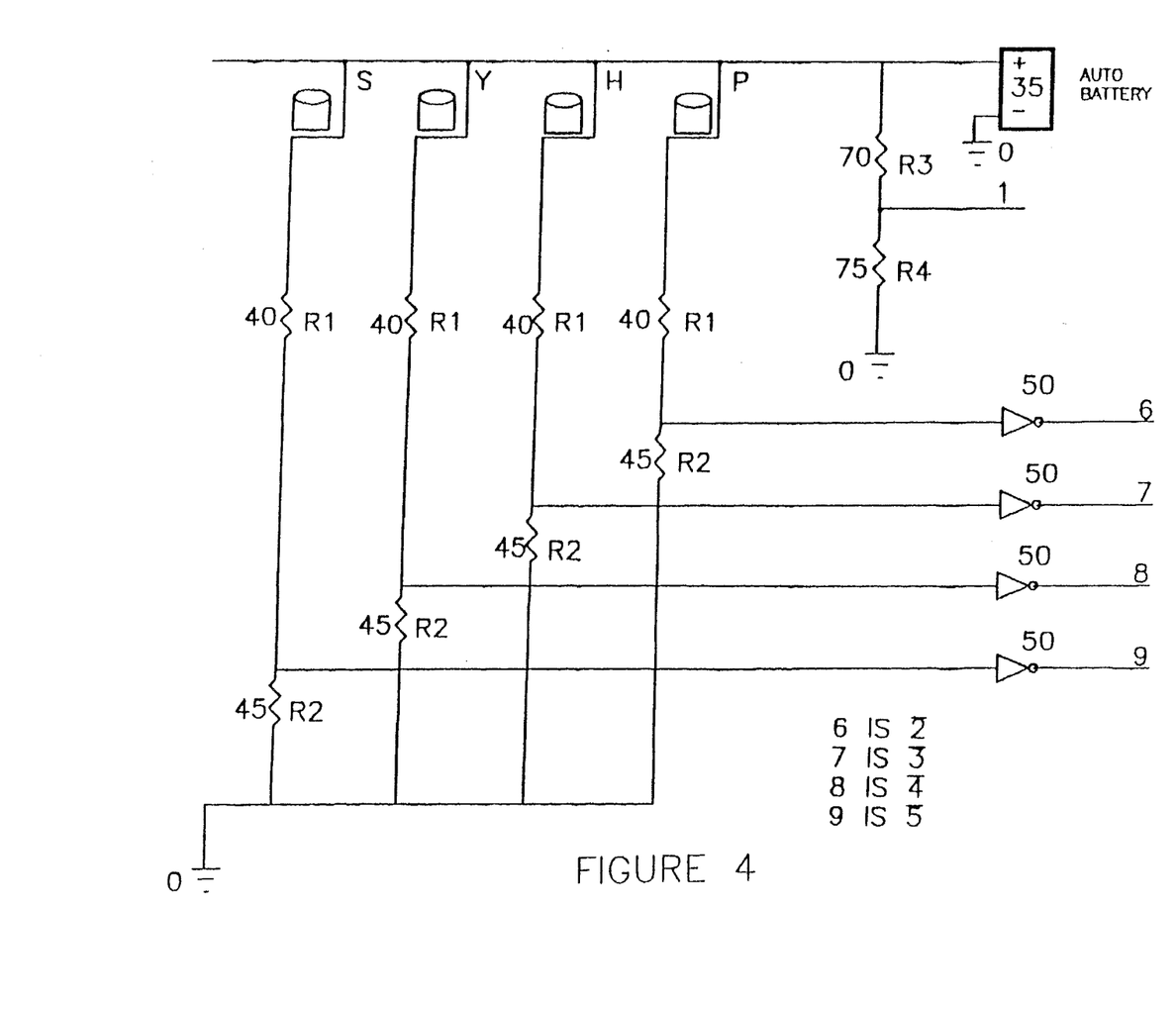
FIG. 4 is a schematic diagram of the control signal generator circuit.

In operation 70 and 75 in FIG. 4 divide the source voltage to output approximately 5 Volts at 1 to bias the timers, inverters and the logic gates. Momentarily depressing any one of the buttons on 30 results in a complete circuit that comprises 35, 40, 45 and 0.

This is a second voltage divider which outputs a very short pulse of approximately 1.5 Volts at points 2, 3, 4 and 5. The output is inverted by 50 and becomes 6, 7, 8 and 9 respectively. The inverted pulse is used to trigger on a monostable timer 55 or 60. If the button depressed is lettered H or P then the output of 60, which is high for 10 seconds in this invention, is used to drive the astable timer 65. The output of 65 taken at 14 or 15 oscillates with a frequency of 0.5 Hz and a 75% duty cycle, or any desired values, is transmitted to the logic gates. If the button depressed is one lettered S or Y, then 55 is triggered on and the output 12 or 13 will be propagated to the logic gates. The gates having 12, 13, 14 and 15 as inputs will output 16, 17, 18, 19, 20, 21 and 22. These outputs with 12, 13, 14 and 15 will now be used to drive the display LEDs. If the H or P button was depressed, then the message "PLEASE HELP" or "PLEASE CALL 911" flashes on the reader board for 10 seconds, or for a time interval set by 60. If the depressed button is lettered S or Y, then a steady message "SORRY" or "THANK YOU" is displayed on the reader board for 10 seconds, or for a period set by 55.

The above description contains specifics and should not be viewed as limitations on the scope of the invention, but rather as an exemple of a preferred embodiment thereof. Many other variations are possible, for example, any one of the memory devices, ROM, EPROM, etc., could be used. But this will require programming, hence the possibility of inappropriate messages put in memory for later display. Rather than the fixed control box, a remote control could be used but this will make the cost of production very high, thereby making it expensive for the vehicle operator. Remote controlling will also greatly increase the risks of misplacing the control box. Voice recognition is another variation, the vehicle operator simply speaks a message which is then displayed on the reader board.

Image processing is yet another version, the reader board displays images instead of words. These images will be recognized to correspond to messages. Rather than situate the reader board on the back dash of the vehicle, the display LEDs could be electronically etched at any level on the rear glass of a vehicle.

Figure 3:
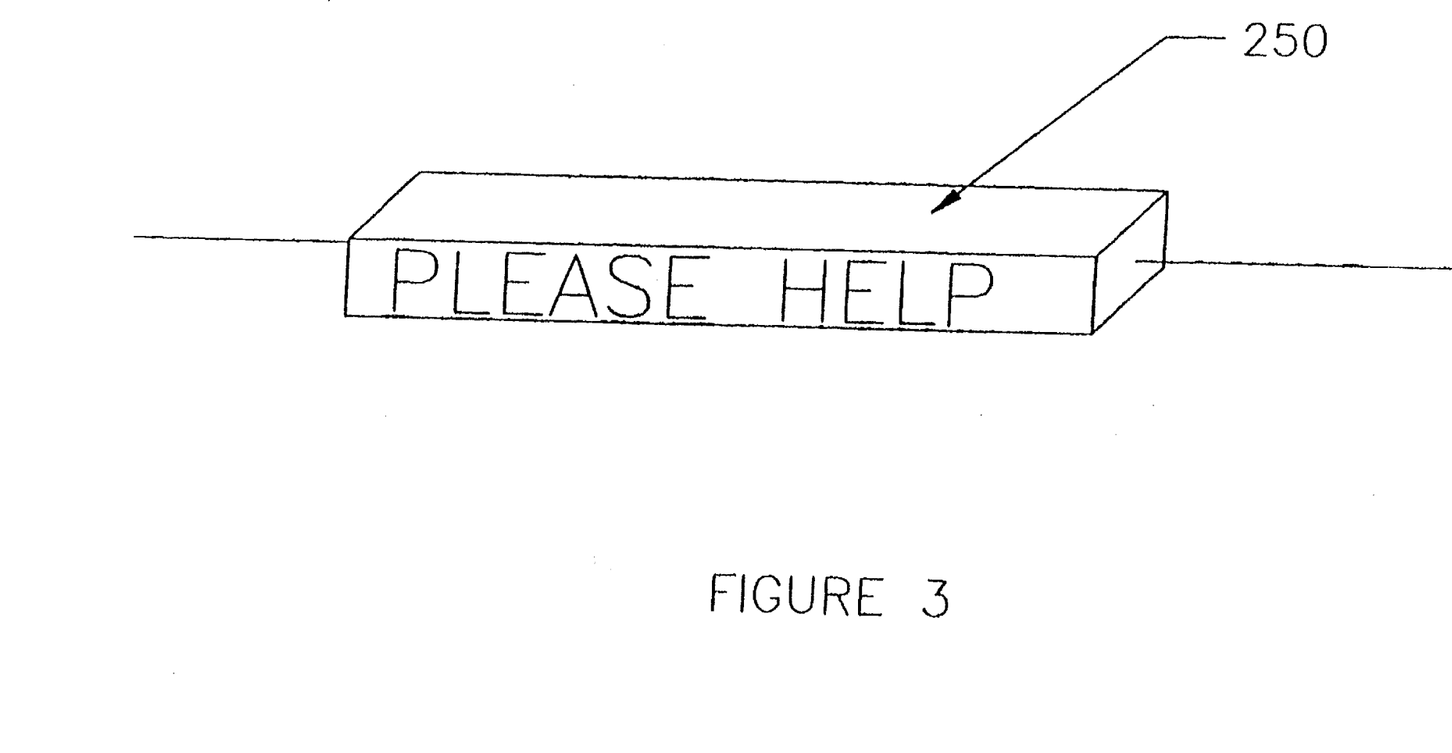
FIG. 3 is a front perspective view of the reader board displaying "PLEASE HELP".
Figure 5:
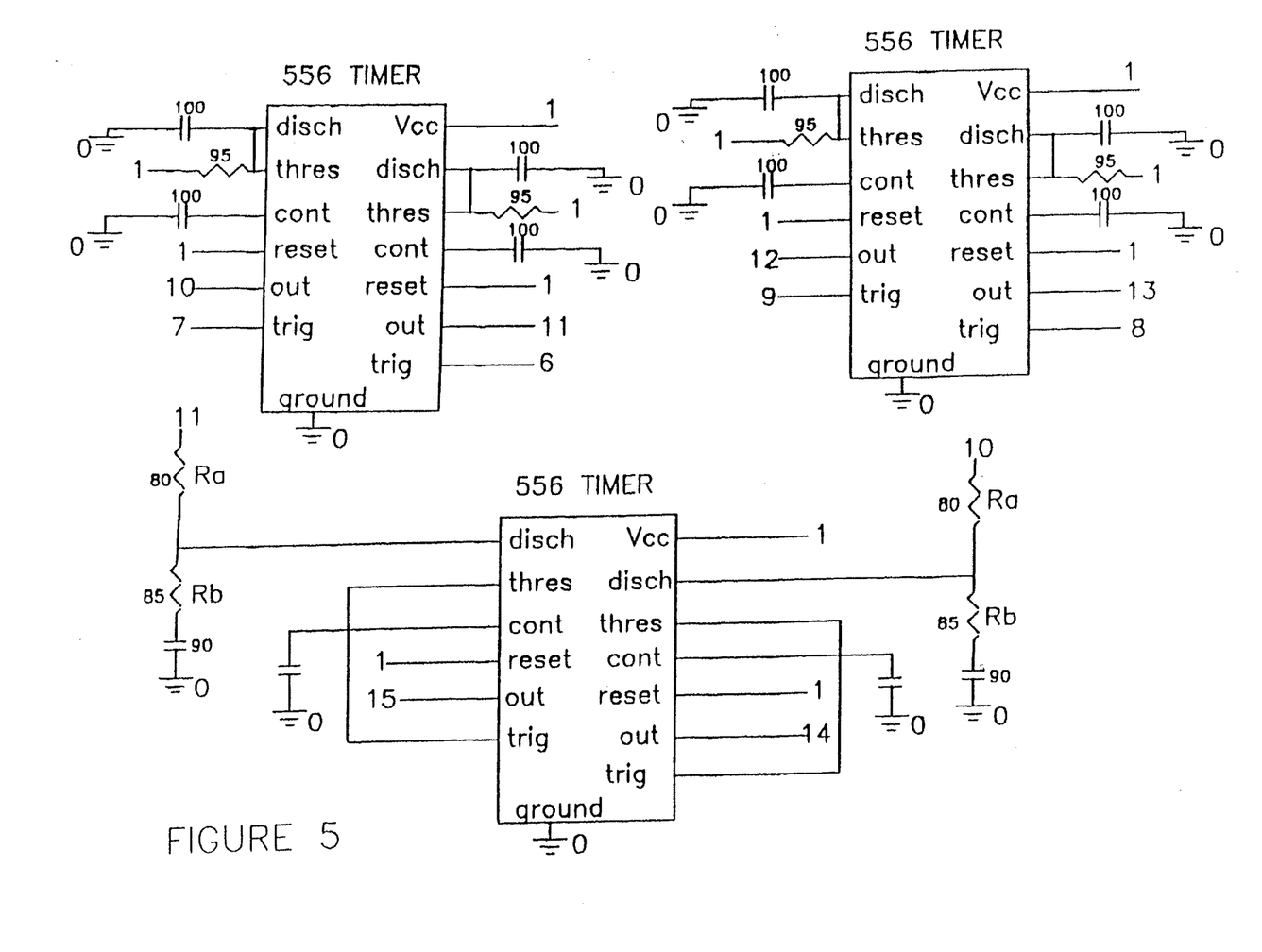
FIG. 5 shows the timing circuit.

Thus by the practice of this invention, there is provided the vehicular goodwill message system for displaying one of four predefined messages with a plurality of seven-segment LED assemblies. The goodwill message system comprises a logic circuit comprising a plurality of logic gates for receiving the four timed signals 12,13,14,15 (see FIG. 5) and for supplying the seven output signals 26,17,18,19,20,21,22 which are electrically communicating with the timing circuit (indicated in FIG. 4 by reference to the reference numbers) and the display (indicated in FIG. 7 by reference to the reference numbers). The control means regulates the four switch lines 6,7,8,9 which are in electrical communication with the timing circuit (shown in FIG. 5). The control means 30 has the control box for supporting the four switch members S, Y, H, P. The timing circuit (as shown in FIG. 4) electrically receives and communicates with the four switch lines 6,7,8,9 for providing four respective and/or corresponding timed signals 15,14,13,12 therefrom corresponding to the four switch lines 6,7,8,9 and for establishing the 10 second energizing interval for the four timed signal lines 15,14,13,12 which electrically communicating with the logic circuit (as shown in FIG. 5) and the control means 30 (as shown in FIG. 3). The display (see FIG. 6) consists of the plurality of light emitting diodes, as shown in FIG. 6 for receiving the seven output signals 16,17,18,19,20,21,22 from the logic circuit (see FIG. 5) and the timed signals 15,14,13,12 from the timing circuit (see FIG. 5), and is responsive to and in communication with the four timed signals 15,14,13,12 of the timing circuit (see FIG. 5) and the seven output signals 16,17,18,19,20,21,22 of the logic circuit (see FIG. 6) such that the display is caused to operate when one of the four timed signals 15,14,13,22 is energized and/or at least one of the seven output signals 16,17,18,19, 20,21,22 is energized. The control means 30 additionally comprises a power supply 35 (see FIG. 4) having a power supply line 1 and a power supply ground 0 for supplying electrical power to the four switch lines 6,7,8,9 such that each switch line 6,7,8,9 electrically communicates with the power supply line 1 through the respective switches P, H, Y, S. The timing circuit (see FIG. 5) additionally comprises means for receiving the switch lines 6,7,8,9 and the power supply lines 0,1 for correspondingly providing and energizing the respective timed lines 15,14,13,12 over the 10 second time interval such that when switch line 9 is energized timed line 12 is accordingly activated for the time interval; when switch line 8 is energized timed line 13 is accordingly activated for the time interval; when switch line 6 is energized timed line 14 is accordingly activated for the time interval; and when switch line 6 is energized timed line 15 is accordingly activated for the time interval. The logic circuit (see FIG. 6) comprises the OR gate 105 having inputs interconnected to timed lines 12,13,14,15 and has output line 16, OR gate 110 has inputs interconnected to timed lines 14,15 and has second output line 21, OR gate 115 has inputs interconnected to timed lines 12,14,15, and has output line 17, OR gate 120 has inputs interconnected to timed lines 12,14 and has output line 18, OR gate 125 has inputs interconnected to timed lines 12,15 and has output line 19, OR gate 130 has inputs interconnected to timed line 13,14, 15 and has output line 22, and OR gate 135 has inputs interconnected to timed lines 12,13 and has output line 20. The display, as shown in FIG. 7, comprises a plurality of either seven-segment or fourteen-segment LED assemblies. LED assembly 140 interconnects output line 21 and the power supply ground 0, LED assembly 145 interconnects output line 21 and the power supply ground 0, LED assembly 150 interconnects output lines 21,17 and the power supply ground 0, LED assembly 155 interconnects with timed line 13, output lines 16,21,17,22, and the power supply ground 0, LED assembly 160 interconnects timed line 12, output lines 17,20,22, and the power supply ground 0, LED assembly 165 interconnects timed line 12, output lines 16,17,21, and the power supply ground 0, LED assembly 170 interconnects with timed lines 12,13, output line 17, and power supply ground 0, LED assembly 175 interconnects timed lines 12,13, output line 17, and the power supply ground 0, LED assembly 180 interconnects output lines 17,18,19,21, and the power supply line 0, LED assembly 185 interconnects output lines 17,18,19,21, and power supply ground 0, LED assembly 190 interconnects timed line 12, output line 17, and the power supply ground 0, LED assembly 195 interconnects timed lines 14,15, output line 21, and the power supply ground 0, LED assembly 200 interconnects timed line 15 and the power supply ground 0, LED assembly 205 interconnects timed line 15 and the power supply ground 0, and LED assembly 210 interconnects timed line 15 and the power supply ground 0. The inverters 50,50,50,50 (see FIG. 4) operatively change the operating voltage level of the switch lines 6,7,8,9, which operating voltage is about 5 volts. The timing circuit, shown in FIG. 5, comprises the first monostable timing I.C. 55 interconnected with switch lines 8,9, the operating voltage power supply line 1 and the power supply ground 0, and produces the timed voltage interval along timed lines 12,13; monostable timing I.C. 60 interconnects switch lines 7,8, operating voltage power supply line 1, and the power supply ground 0 and produces the timed voltage interval along intermediate lines 10,11; and astable timing I.C. 65 interconnects intermediate lines 10,11 operating voltage power supply line 1 and the power supply ground 0, and produces oscillating timed voltage along timed lines 4,15.

What is claimed:

1. A vehicular goodwill message system for displaying messages comprising:

(a) a logic circuit comprising a plurality of logic gates for receiving at least four timed signals and for supplying at least seven output signals and for electrically communicating with a timing means and a display means;

(b) a control means (30) for regulating at least four switch lines in electrical communication with a timing means comprising a control box for supporting at least four switch members; said control means additionally comprising a first switch member (S), a second switch member (Y), a third switch member (H), and a fourth switch member (P);

(c) a timing means for receiving said least four switch lines and communicating with said least four switch lines and for providing at least four timed signals therefrom corresponding to said least four switch lines and for establishing an energizing interval for said least four timed signals and for electrically communicating with said logic circuit and said control means;

(d) a display means consisting of a plurality of light emitting diodes for receiving said least seven output signals and said least four timed signals responsive to and in communication with said least four timed signals of said timing means and said least seven output signals of said logic circuit such that said display means is caused to operate when one of said least four timed signals is energized and at least one of said least seven output signals is energized for displaying messages; and (e) a housing for supporting said logic circuit, said timing means, and said display means, and comprising a translucent front panel member wherethrough the displayed messages are visable.

2. The apparatus of claim 1 wherein said control means additionally comprises a power supply line; said least four switch lines comprising a first switch line (9), a second switch line (8), a third switch line (7), and a fourth switch line (6); said first switch member (S) communicating with said power supply line and said first switch line (9) to switchably complete a first circuit between said power supply line and said first switch line; said second switch member (Y) communicating with said power supply line and said second switch line (8) to switchably complete a second circuit between said power supply line and said second switch line; said third switch member (H) communicating with said power supply line and said third switch line (7) to switchably complete a third circuit between said power supply line and said third switch line; and said fourth switch member (P) communicating with said power supply line and said fourth switch line (6) to switchably complete a fourth circuit between said power supply line and said fourth switch line.

3. The apparatus of claim 2 additionally comprising a voltage changing means (50) for operatively changing an operating voltage level of said first switch line (9), said second switch line (8), said third switch line (7), and said fourth switch line (6); said operating voltage being about 5 volts; and an operating voltage power supply line (1) in communication with said timing means.

4. The apparatus of claim 3 wherein said timing means comprises means for receiving said first switch line (9), said second switch line (8), said third switch line (7), said fourth switch line (6), and said operating voltage power supply line (1), and for providing and energizing said least four timed lines such that when said first switch line (9) is energized a first timed line (12) is accordingly activated, when said second switch line (8) is energized a second timed line (13) is accordingly activated, when said third switch line (7) is energized a third timed line (14) is accordingly activated, and when said fourth switch line (6) is energized a fourth timed line (15) is accordingly activated.

5. The apparatus of claim 4 wherein said logic circuit comprises a first OR gate (105) interconnected to said first timed line (12), said second timed line (13), said third timed line (14), said fourth timed line (15), and having a first output line (16); a second OR gate (110) interconnected to said third timed line (14) and said fourth timed line (15) and having a second output line (21); a third OR gate (115) interconnected to said first timed line (12), said third timed line (14), and said fourth timed line (15), and having a third output line (17); a fourth OR gate (120) interconnected to said first timed line (12) and said third timed line (14) and having a fourth output line (18); a fifth OR gate (125) interconnected to said first timed line (12) and to said fourth timed line (15) and having a fifth output line (19); a sixth OR gate (130) interconnected to said second timed line (13), said third timed line (14), and said fourth timed line (15), and having a sixth output line (22); and a seventh OR gate (135) interconnected to said first timed line (12) and to said second timed line (13) and having a seventh output line (20) .

6. The apparatus of claim 5 wherein said display means comprises a plurality of seven-segment light emitting diode assemblies interconnected with said least seven output signals of said logic circuit and said least four timed circuit lines.

7. The apparatus of claim 5 wherein said display means comprises a first LED assembly interconnected with said second output line and comprising a seven-segment LED assembly; a second LED assembly interconnected with said second output line and comprising a seven-segment LED assembly; a third LED assembly interconnected with said second output line and said third output line and comprising a seven-segment LED assembly; a fourth LED assembly interconnected with said second timed line, said first output line, said second output line, said third output line, and said sixth output line and comprising a seven-segment LED assembly; a fifth LED assembly interconnected with said first timed line, said third output line, said sixth output line, and said seventh output line and comprising a seven-segment LED assembly; a sixth LED assembly interconnected with said first timed line, said first output line, said second output line, and said third output line and comprising a seven-segment LED assembly; a seventh LED assembly interconnected with said first timed line, said second timed line, and said third output line and comprising a fourteen-segment LED assembly; an eighth LED assembly interconnected with said first timed line, said second timed line, and said third output line and comprising a fourteen-segment LED assembly; a ninth LED assembly interconnected with said second output line, said third output line, said fourth output line, and said fifth output line and comprising a seven-segment LED assembly; a tenth LED assembly interconnected with said second output line, said third output line, said fourth output line, and said fifth output line and comprising a seven-segment LED assembly; an eleventh LED assembly interconnected with said first timed line and said third output line and comprising a seven-segment LED assembly; a twelfth LED assembly interconnected with said third timed line, said fourth timed line, and said second output line and comprising a seven-segment LED assembly; a thirteenth LED assembly interconnected with said fourth timed line and comprising a seven-segment LED assembly; a fourteenth LED assembly interconnected with said fourth timed line and comprising a seven-segment LED assembly; and a fifteenth LED assembly interconnected with said fourth timed line and comprising a seven-segment LED assembly.

8. The apparatus of claim 4 wherein said timing means further comprises a first monostable timing I.C. (55) interconnected with said first switch line (9), said second switch line (8) and said operating voltage power supply line (1), and producing a first timed voltage interval along said first timed line (12) and said second timed line (13); a second monostable timing I.C. (60) interconnected with said third switch line (7), said fourth switch line (8), and said operating voltage power supply line (1), and producing a second timed voltage interval along a first intermediate line (10) and a second intermediate line (11), and producing a second timed voltage interval along said first intermediate line (10) and said second intermediate line (11); and an astable timing I.C. (65) interconnected with said first intermediate line (10), said second intermediate line (11), and said operating voltage power supply line (1), and producing a third timed voltage interval along said third timed line (14) and said fourth timed line (15).

9. The apparatus of claim 8 wherein said seventh LED assembly (170) comprises a fourteen-segment LED assembly and wherein said eighth LED assembly (175) comprises a fourteen-segment LED assembly.

* * * * *